Aug. 5, 1952  A. E. E. KUESTNER  2,605,589
SOD UNIT
Filed Nov. 14, 1950

INVENTOR.
Alfred E. E. Kuestner,
BY Victor J. Evans & Co.
ATTORNEYS

Patented Aug. 5, 1952

2,605,589

UNITED STATES PATENT OFFICE 2,605,589

SOD UNIT

Alfred E. E. Kuestner, Trenton, N. J.

Application November 14, 1950, Serial No. 195,641

2 Claims. (Cl. 47—56)

This invention relates to manufactured sod used for lawns, terraces and other coverings, and in particular squares of sod wherein grass seed are placed on a layer of humus, peat moss or material containing plant food with hormones, vitamins and trace minerals with the layer of material positioned upon mesh having a similar layer of material forming a plant food on the under side and with the seed covered through a thin layer of sand.

The purpose of this invention is to provide a sod unit to be used as a covering for lawns, terraces, and the like wherein the sod may be formed in units to facilitate transportation and in which the materials of the units are held together by the roots of the grass embedded in a layer of mesh.

Various methods have been employed for producing grass sod particularly for use on golf courses, cemeteries, lawns, terraces and the like but where the sod is cut and rolled it breaks in transportation and it is not only difficult to handle but the waste is excessive. With this thought in mind this invention contemplates a sod unit whereby the seed are embedded in substances forming plant foods and the roots are embedded in a layer of mesh formed of plastic or the like whereby the mesh forms a body retaining the plant food material, roots, and small plants in compact assembled relation.

The object of this invention is, therefore, to provide an improved sod unit in layers whereby the layers are retained in units suitable for transportation and planting.

Another object of the invention is to provide an improved sod in which the parts are held together to prevent washing by heavy rains, particularly on terraces or the like.

Another object of the invention is to provide an improved sod unit wherein the sod forms a continuous mat which facilitates choking out weeds and the like.

Another object of the invention is to provide grass sod that is permanently retained in position and that may readily be cut to form different patterns.

Another object of the invention is to provide improved sod units or a grass carpet in which the elements are secured together with mesh of plastic or the like whereby units may be anchored in position.

A further object of the invention is to provide an improved sod unit whereby grass carpets may readily be formed which is comparatively simple and inexpensive.

With these and other objects and advantages in view the invention embodies sod formed in layers with mesh positioned between layers of humus, peat moss or other plant foods and wherein a layer of seed is positioned upon plant food material and covered with sand or the like.

Other features and advantages of the invention will appear from the following description taken in connection with the drawings wherein.

Figure 1:
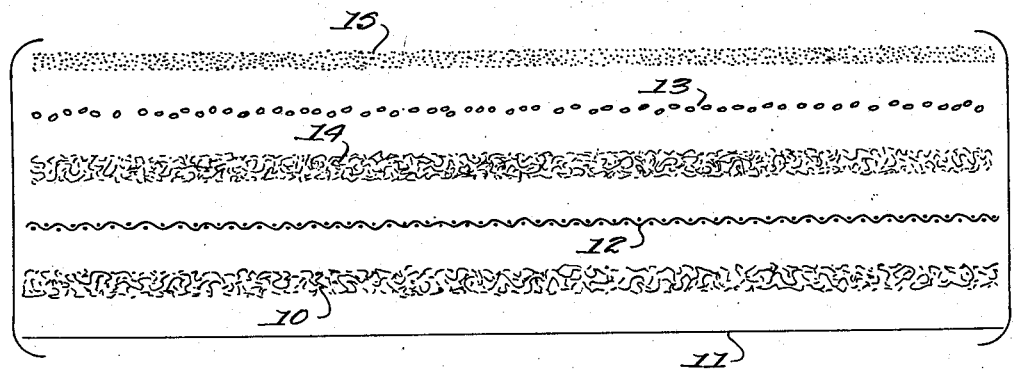
Figure 1 is an exploded cross sectional view showing the layers of materials in spaced relation.
Figure 2:
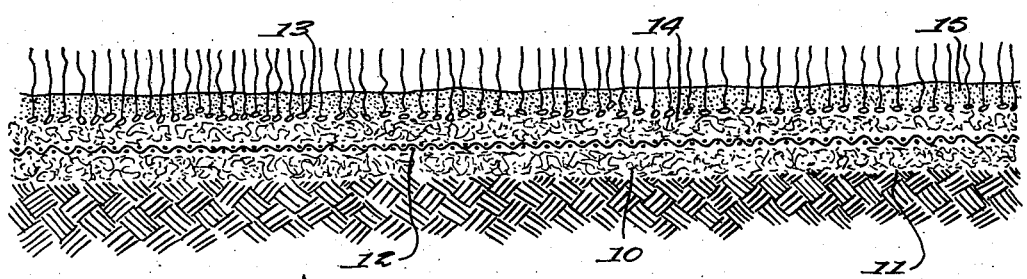
Figure 2 is a similar view showing the layers of material together.
Figure 3:
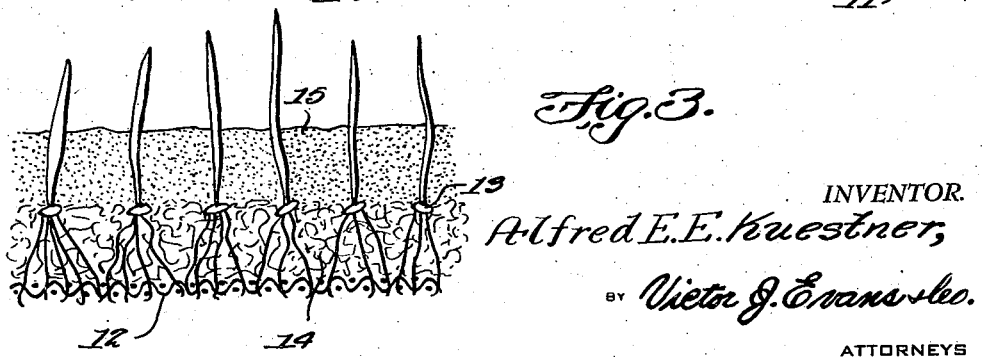
Figure 3 is also a similar view on an enlarged scale illustrating a section through the sod with the seed sprouted or with the small plants partly grown.

Referring now to the drawings wherein like reference characters denote corresponding parts the improved sod of this invention includes layers of peat moss, humus or the like 10 positioned on the ground 11 with a layer of mesh 12 positioned on the layer 10 and with seed 13 positioned upon the layer 14 of material similar to the layer 10, and covered by a thin layer of sand 15.

The layers 10 and 14 of humus, peat moss, and the like contain plant foods such as hormones, vitamins and trace minerals and with these layers providing food for the plants, food is supplied to the plants forming the sod or grass carpet for an indefinite period of time after the sod is permanently planted.

Although sand has been suggested as a covering for the seed it will be understood that vermiculite or other suitable substances may be used.

It will also be understood that different types of seed may be used in the sod as seed that produce grass that grows better in the shade, in the sun, or in damp or dry locations may be used and the sod may be designated accordingly.

In preparing the sod it is preferred to use a relatively thin layer of humus, peat moss, or the like on the ground with the mesh, which may be of plastic or other suitable material placed upon the humus or peat moss, and with a comparatively thick layer of humus, peat moss or the like placed upon the mesh. The seed are then placed upon the upper layer of humus, peat moss or the like and the seed are covered with sand, vermiculite or the like.

The use of a comparatively fine mesh will prevent seed from the soil below breaking through the sod and with sod formed in this manner the finished product is substantially free of weeds and the like.

Sod formed by this means may be rolled or packed in cartons for shipping and may readily be cut with a pair of scissors, shears or the like so it may be fit around flower beds, walks, stairways and the like.

It will be understood that modifications may be made in the arrangement of the layers without departing from the spirit of the invention.

What is claimed is:

1. As a new article of manufacture, a sod unit comprising a layer of humus, plastic mesh positioned upon the layer of humus, an upper layer of humus positioned upon the plastic mesh, a layer of seed positioned upon the upper layer of humus, and a layer of sand positioned upon and providing a cover for the seed, said plastic mesh being interposed between the two layers of humus, said seeds being spaced above said plastic mesh and below the sand, whereby upon germination of the seeds the roots of the seeds pass through the upper layer of humus, through the plastic mesh, and into the lower layer of humus, said roots maintaining the layers as a unit.

2. As a new article of manufacture, a sod unit comprising a layer of humus, plastic mesh positioned upon the layer of humus, an upper layer of humus positioned upon the plastic mesh, the thickness of the layer of humus upon the mesh being greater than the layer of humus upon which the mesh is positioned, a layer of seed positioned upon the upper layer of humus, and a layer of sand positioned upon and providing a cover for the seed, said plastic mesh being interposed between the two layers of humus, said seeds being spaced above said plastic mesh and below the sand, whereby upon germination of the seeds the roots of the seeds pass through the upper layer of humus, through the plastic mesh, and into the lower layer of humus, said roots maintaining the layers as a unit.

ALFRED E. E. KUESTNER.

REFERENCES CITED

The following references are of record in the file of this patent:

UNITED STATES PATENTS

| Number | Name | Date |
|---|---|---|
| 526,512 | Weber et al. | Sept. 25, 1894 |
| 776,246 | Kanst | Nov. 29, 1904 |
| 1,971,504 | Pratt | Aug. 28, 1934 |
| 2,029,343 | Sperr | Feb. 4, 1936 |
| 2,192,939 | Slayter et al. | Mar. 12, 1940 |
| 2,243,857 | Fischer | June 3, 1941 |